United States Patent [19]

Stark et al.

[11] Patent Number: 4,514,771
[45] Date of Patent: Apr. 30, 1985

[54] METHOD AND APPARATUS FOR IMPROVING DISK STORAGE CAPACITY

[75] Inventors: Glenn Stark, Santa Cruz; David M. Barton, San Jose, both of Calif.

[73] Assignee: Victor Technologies Inc., Scotts Valley, Calif.

[21] Appl. No.: 434,075

[22] Filed: Oct. 13, 1982

[51] Int. Cl.³ ............................................. G11B 19/24
[52] U.S. Cl. ....................................................... 360/73
[58] Field of Search .................... 360/73; 369/43, 44, 369/56, 240

[56] References Cited

U.S. PATENT DOCUMENTS

| | | | |
|---|---|---|---|
| 1,221,074 | 4/1917 | MacLane | 369/53 |
| 2,505,630 | 4/1950 | Weathers | 369/240 |
| 2,692,141 | 10/1954 | Rudenauer | 369/240 |
| 2,901,737 | 8/1959 | Stovall . | |
| 3,646,259 | 2/1972 | Schuller | 360/73 |
| 4,190,860 | 2/1980 | Somers et al. | 358/128.5 |
| 4,351,044 | 9/1982 | Imanaka et al. | 369/43 |

FOREIGN PATENT DOCUMENTS

| | | | |
|---|---|---|---|
| 54-10707 | 1/1979 | Japan | 360/73 |
| 2046979 | 11/1980 | United Kingdom | 360/73 |

*Primary Examiner*—George G. Stellar
*Attorney, Agent, or Firm*—Townsend and Townsend

[57] ABSTRACT

Data is stored on a rotating memory disk by maintaining constant the relative velocity between the recording transducer and the recording media. The rotational speed of the disk is varied as the transducer is translated radially of the disk recording surface, the disk surface being divided into a number of concentric track zones each containing a predetermined number of tracks. For any given zone, an optimum rotational motor speed is established and the rotational speed of the disk is maintained at that zone speed when the transducer position signals specify a given zone. As the transducer is commanded to step to a different track in a different zone, the rotational speed of the disk is altered to match the new zone speed within a relatively short period of time. Once the transducer is located within the given zone, the rotational disk speed is maintained at that zone speed for motion within the zone.

7 Claims, 5 Drawing Figures

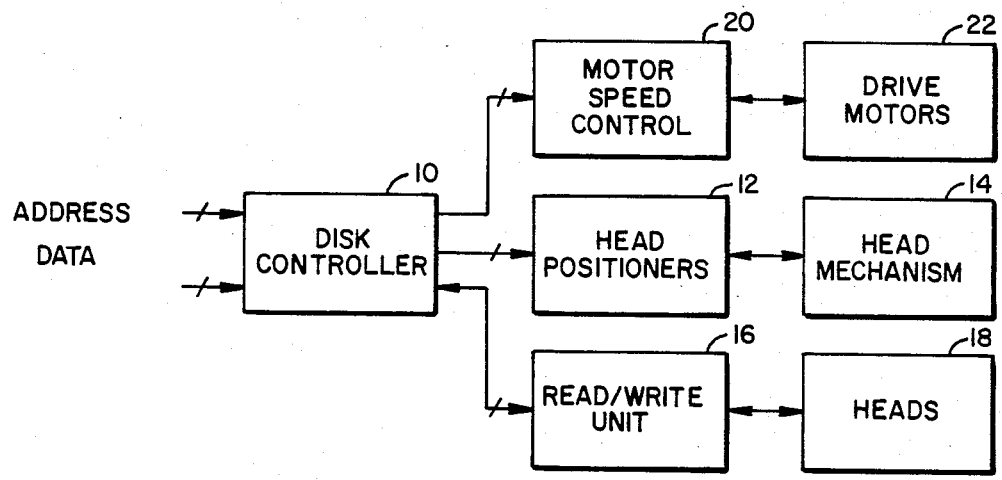
FIG._1.
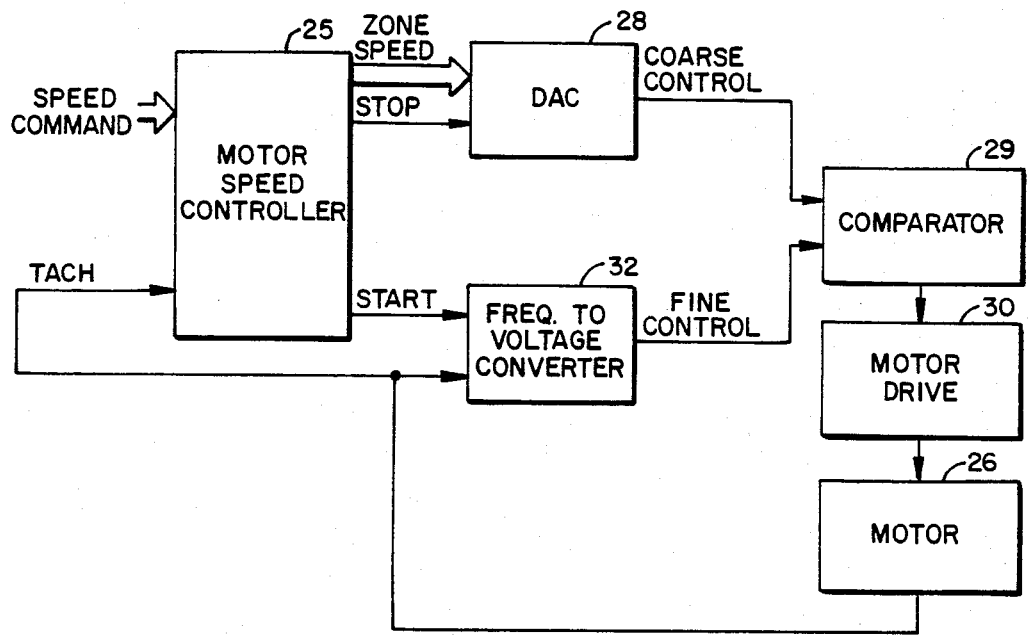
FIG._2.

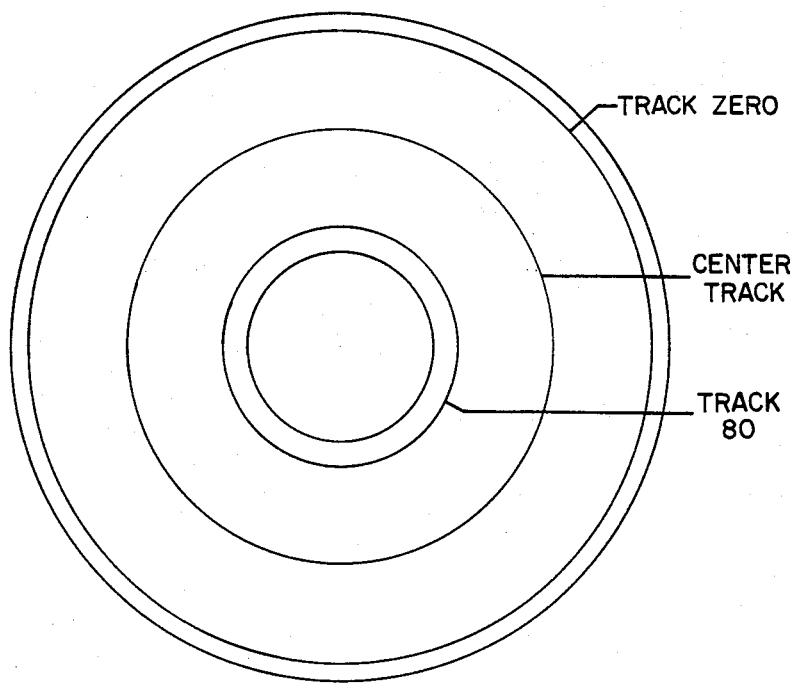
FIG._3.
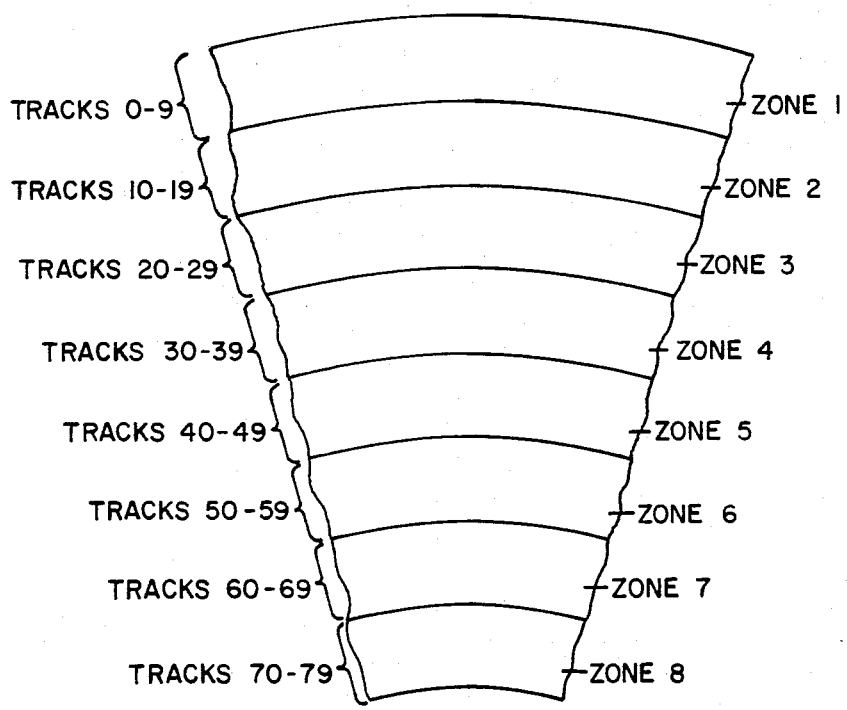
FIG._4.

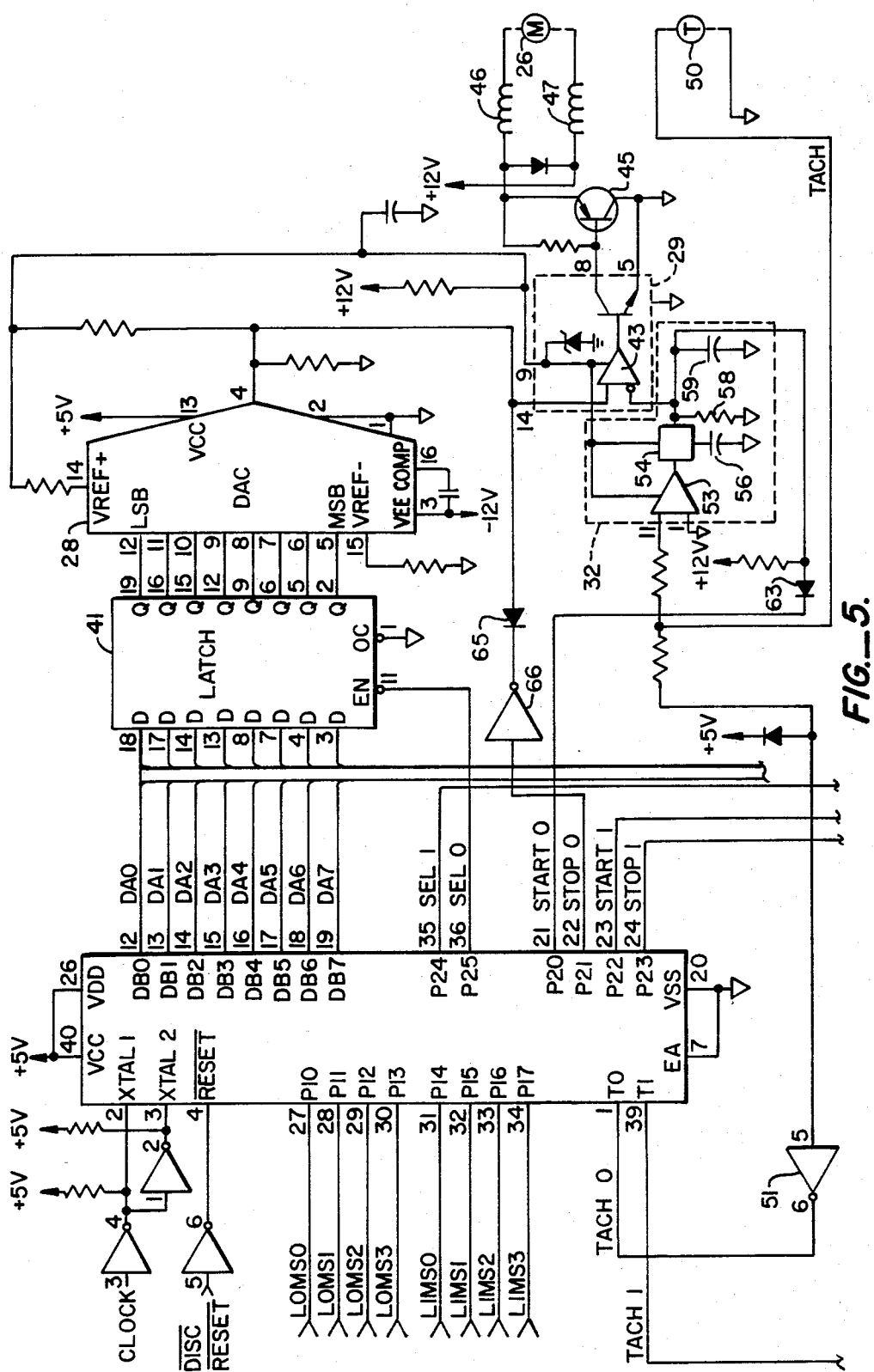
FIG._5.

METHOD AND APPARATUS FOR IMPROVING DISK STORAGE CAPACITY

BACKGROUND OF THE INVENTION

Field of the Invention

This invention relates to rotating disk memory storage devices used in connection with digital computer systems.

Rotating disk memory storage devices are used in conjunction with digital computers to magnetically store digital information on a non-volatile basis. A typical device of this type includes a spindle rotated by a drive motor mechanism, one or more recording disks attached to the spindle, either permanently or removably, for rotation therewith at a relatively precise constant speed, and an electromechanical read/write assembly for enabling information to be written onto and read from the disk recording surfaces. Each read/write assembly includes a number of transducers for reading and writing data magnetically from and to the individual disk recording surfaces, and a corresponding number of transducer motion translation mechanisms, typically operated by stepper motors to effect radial motion of the transducers across the recording surface of each disk. The stepper motors are typically driven by control circuitry which receives electrical position signals in digital form from the associated computer and converts this position information into mechanical motion of the transducer heads.

Each annular recording surface of a disk is usually arranged in the form of concentric circular tracks divided in the circumferential direction into track sectors, in order to enable access locations to be accurately specified by the associated computer for rapid and accurate information storage and retrieval.

Recent trends in the development of rotating disk memory storage devices have been toward reduction in the physical size of the system without sacrificing, and in many cases actually increasing, the storage capacity of each disk. These trends have been especially evident in disk drives designed for use with small business computers and personal computers, which nearly exclusively employ five and a quarter inch fixed rigid disks, removable flexible (floppy) disks or a combination of both. Due to the relatively small surface area available for information storage on such disks, many efforts have been made to maximize the amount of information which can be accurately stored on such disks, which efforts have included a wide variety of specially designed recording techniques, read/write transducers with increasingly narrow heads (to reduce the track width), and disk recording layers with improved magnetic recording properties and finer surface smoothness.

SUMMARY OF THE INVENTION

The invention comprises a method and apparatus for expanding the information storage capacity of a rotating disk memory storage device which is compatible with a wide variety of commercially available disks and which enables a substantially increased amount of information to be stored.

In its broadest aspect, the invention comprises the technique of maintaining constant the relative velocity between the recording transducer and the recording media. This technique is achieved by varying the rotational speed of the disk as the read/write transducer is translated radially inwardly or outwardly of the disk recording surface. While the speed of the recording surface in the circumferential direction relative to the read/write transducer normally changes with the radial position of the transducer in ordinary disk memory storage devices, in devices incorporating the invention, the rotational speed of the disk is varied to compensate for this ordinary change in linear speed.

The disk surface is conceptually divided into a plurality of concentric track zones, each zone containing a predetermined number of tracks. For any particular zone, an optimum rotational motor speed is established and the rotational speed of the disk is maintained at that zone speed whenever the transducer position signals specify translation of the read/write transducer to a particular zone. As the transducer is commanded to step to a different track in a different zone, the rotational speed of the disk is altered to match the new zone speed within a relatively short period of time. Thereafter, the rotational disk speed is maintained at the new zone speed until the transducer is commanded to move to a track lying within a different zone.

By controlling the speed of disk rotation in accordance with the radial position of the transducer, and thus the circumference of the underlying track, certain limitations in prior art systems are overcome. More specifically, the traditional approach to storing data on rotating memory disks, particularly floppy disks, involves writing data at a fixed rate onto each track while rotating the disk at a constant speed. Since the circumference of the outer most track on the disk is larger than all the other tracks, the recording density on the outer most track must be lower than the recording density on the inner most track. The major limiting factor in recording on magnetic media is bit density. Consequently, the outer tracks contain much less data than would be possible if all tracks were recorded at the same density. In addition, by rotating the disk at a constant speed the linear velocity of the head, relative to the media, varies from track to track. Since the amplitude of the recorded signal is partly a function of speed, the signal amplitude varies greatly from the outer most track (highest amplitude) to the inner most track (lowest amplitude). As a result, the signal to noise ratio of the read circuitry is substantially less than that obtainable with the invention, which makes it possible to record all tracks with a constant amplitude signal.

With reference to the track zone arrangement, the number of tracks in a zone is dependent primarily upon the difference in circumference between tracks and the desire to add additional sectors to a group of tracks. More specifically, even though each track is slightly different in circumferential length, it is not possible to take advantage of the potential difference in storage capacity without using sectors of varying size. Given the desire to use sectors of predetermined size (i.e. length), the rotational speed is changed only when this will result in enough additional capacity for an extra sector.

From an apparatus standpoint, the invention comprises a motor speed control circuit which includes means for specifying a particular zone speed, means responsive to the zone speed specifying means for providing driving current to the disk motor to achieve the specified zone speed, and feedback means for monitoring the actual motor speed and maintaining the actual motor speed at the specified zone speed. The zone speed specifying means includes a digital-to-analog converter responsive to digital input character commands specifying a particular zone speed for generating a coarse analog control signal representative of the digital command character. The digital input character commands are generated by a dedicated controller which receives zone command signals from the associated computer. The dedicated controller also monitors the actual motor speed by way of a tachometer feedback signal and compares the actual motor speed with the desired or specified zone speed. If the actual motor speed varies from the desired speed, the dedicated controller alters the digital input character into the digital-to-analog converter and thus the coarse control voltage. This digital control loop provides a very fast slew rate for large commanded changes in motor speed to insure that the disk will arrive at the desired new zone speed in a relatively short period of time.

The motor speed control circuitry includes an operational amplifier which receives the coarse control signal from the digital to analog converter and an output transistor driven by the operational amplifier to drive a power transistor coupled to the disk motor circuit. An analog tachometer feedback signal, which monitors the actual motor speed, is coupled to a motor speed correction circuit, which comprises a frequency to voltage converter including a Schmitt trigger for converting the sinusoidal analog tachometer signal to a logic signal, a current mirror circuit for generating a pair of current pulses from the logic signal for each tachometer cycle, and a filter circuit for producing a fine control signal consisting of a dc voltage from the current pulses. The fine control signal comprises a D.C. level component proportional to tach frequency and a superimposed triangular ripple component. This fine control signal is coupled to the other input of the operational amplifiers and provides a pulse width modulated switching control for the motor power transistor, so that the motor is switched on and off at twice the tachometer frequency.

When a large change in the motor speed is commanded, the coarse control voltage from the digital-to-analog converter overrides the operation of the fine control signal and either turns the drive motor on "hard" or completely off, which maximizes acceleration and deceleration of the disk. In the fine mode of operation, in which the fine control voltage is close to the digital-to-analog converter supplied coarse control voltage, the ripple present on the fine control signal drives the voltage alternately above and below the coarse control voltage, which switches the motor on and off at twice the tachometer frequency. If the angular motor velocity increases, the fine control voltage duty-factor decreases, which results in a slight deceleration of the motor. If the angular motor speed decreases, the duty factor increases, applying more power and increasing the angular speed. By varying the average power to the motor and driving the motor in a switching mode, power dissipation in the power transistor is minimized.

Two additional functions are provided to enhance the operation of the invention. First, the fine control voltage can be quickly reduced below the minimum coarse control voltage by a separate diode path using a motor start signal generated by the dedicated controller. This eliminates the necessity to wait for the frequency to voltage converter output capacitor to discharge. In response to a stop command, the coarse control voltage is overridden and forced to a minimum value. The disk controller can thus override control of both the coarse and fine speed control signals, which is especially useful for stall protection. Specifically, upon generation of a start command, the disk controller can monitor the actual speed of the motor to ensure that the motor achieves the desired zone speed within the permitted period of time. If the motor fails to ramp to the desired speed, the disk controller can generate the motor stop signal. This affords low cost jam protection for the disk drive. A motor restart routine can also be provided in the disk controller in the event of a jam failure so that the disk drive automatically becomes operational after a jam is cleared by the operator.

For a fuller understanding of the nature and advantages of the invention, reference should be had to the ensuing detailed description taken in conjunction with the accompanying drawings.

BRIEF DESCRIPTION OF THE DRAWINGS

FIG. 1 is a simplified block diagram of the preferred embodiment of the invention;

FIG. 2 is a block diagram showing the motor speed control major components;

FIG. 3 is a schematic plan view of one side of a memory disk showing the typical track layout;

FIG. 4 is an enlarged partial top plan schematic view illustrating the track zones; and FIG. 5 is a logic diagram showing critical components of the preferred embodiment.

DESCRIPTION OF THE PREFERRED EMBODIMENTS

Turning now to the drawings, FIG. 1 illustrates the major components of a disk drive system constructed according to the teachings of the invention. As seen in this Fig., address and data from an associated digital computer is provided to a disk controller 10 which provides an active interface between the computer and the major components of the disk drive system. Thus, the disk controller 10 generates control signals for a head positioner unit 12, which controls the operation of the electromechanical head mechanisms 14 to position the read/write transducers over the proper disk tracks. In addition, disk controller 10 generates control signals for a read/write unit 16, which contains conventional circuitry for operating the read/write transducer heads 18 in order to write information onto the disk and read information from the disk once the transducer heads are accurately positioned. Further, the disk controller 10 provides digital information signals to a motor speed control unit 20, which generates motor speed control signals for the drive motors 22 in accordance with the invention.

With reference to FIG. 2, the motor speed control unit 20 includes a motor speed controller 25 which receives zone commands from the computer via the disk controller 10 and a motor speed feedback signal, labelled TACH, from a disk drive motor 26. The motor speed controller 25 also generates zone speed commands which specify a desired zone speed for the disk, and a special stop command, which signals are coupled to a digital-to-analog converter 28 (hereinafter DAC 28). DAC 28 generates a coarse control signal, which is coupled via a comparator 29 to the motor drive circuitry 30 for motor 26.

The TACH signals from motor 26, which are generated by means of a conventional tachometer coupled to the motor 26, are also coupled as an input to a frequency to voltage converter 32, along with a special start command from motor speed controller 25. Converter 32 generates fine control signals which are coupled via comparator 29 to the motor drive circuitry 30. As described more fully below, the coarse control signals are used to change the speed of motor 26 in relatively large increments, while the fine control signals maintain the motor speed within a relatively precise range once the motor has achieved the proper zone speed. In the preferred embodiment, motor speed controller 25 comprises an Intel type 8748 integrated circuit, while the remaining elements have the preferred construction described below.

With reference to FIG. 3, the disk recording surface is conceptually arranged in an annular recording band having a plurality of concentric circular tracks, with the outer most track labelled track 0 and the inner most track labelled track 79. According to the invention, the disk is also arranged conceptually into eight different zones each containing a predetermined number of tracks. In the particular arrangement illustrated, the outer most zone contains tracks 0–9 and the inner most zone contains tracks 70–79. For each particular zone, a predetermined angular speed of the disk is maintained within precise limits according to the invention, and whenever the transducer head is commanded to move to a track in a different zone, the angular speed of the disk is changed to a new value, so that the relative linear speed between the transducer head and the portion of the disk recording surface directly below the head is maintained relatively constant. The purpose of this is to achieve relatively constant head/media velocity and thus relatively constant recording density. In the preferred embodiment, with eight zones and ten tracks per zone, the total variation in the head/media velocity is approximately ±four percent, and the angular speed of the center track (track 40) is five revolutions per second for a five and a quarter inch flexible disk drive (300 rpm).

FIG. 5 illustrates the circuit components actually employed in the preferred embodiment of the invention. As seen in this Fig., motor speed controller 25 receives zone commands L0MS0–L0MS3 from the disk controller, and generates internal 8-bit zone speed commands DA0–DA7, which are coupled to the inputs of a type LS373 latch 41. Latch 41 is enabled by a select signal from controller 25 labelled SEL0, and serves to stabilize the 8-bit parallel digital character generated by controller 25. The eight data line outputs of latch 41 are coupled to the input terminals of DAC 28, which comprises a type 0808 converter available from Precision Monolithics or National Semiconductor. DAC 28 converts the digital input character to an analog coarse speed control signal, which is coupled to one input of the operational amplifier portion 43 of a type LM2917N motor speed control integrated circuit. The remaining input to comparator 43 comprises a fine control signal generated by frequency to voltage converter 32 in the manner described below. The output of comparator 43 is used to drive an internal transistor, which in turn controls a power transistor 45 coupled to motor 26 by means of inductances 46, 47.

A conventional tachometer 50 is mechanically coupled to the shaft of motor 26 in order to generate a sinusoidal analog tachometer signal, labelled TACH 0 which is coupled as a reference input to frequency to voltage converter 32 and is also coupled by means of an inverter 51 as a reference input to controller 25. This TACH 0, signal has a frequency which is directly proportional to the speed of motor 26, and is converted to a logic signal by means of Schmitt trigger 53. This logic signal, whose period is proportional to motor speed, is used to steer a double ended current mirror circuit 54 which charges an external capacitor 56 at a fixed current until the voltage reaches an internally provided limit. The resulting current pulse also flows out of circuit 54 and is filtered by R-C network 58, 59, which is connected to the inverting input of operational amplifier 43.

With a TACH 0 signal applied to the input of Schmitt trigger 53, two units of charge are delivered to the R-C network 58, 59 for every cycle of the TACH 0 input signal. The quantity of charge delivered per pulse is a function only of the internal voltage reference levels and of the value of external capacitor 56. Since the charge per pulse is fixed, the average output current is two$\times Q\times$TACH frequency, where Q is the charge per pulse. The RC network 58, 59 functions as a partially effective ripple filter, with the value of capacitor 59 chosen sufficiently small that a certain ripple voltage is maintained. Since the pulses are constant current, variable frequency, the fine control voltage wave form applied to the inverting input of operational amplifier 43 is a dc level signal with a superimposed triangular ripple. The dc level is proportional to TACH 0 frequency (and thus motor speed), while the ripple frequency is twice the TACH 0 frequency.

Since there are no feedback components around operational amplifier 43, the very high open loop gain is retained and, for all practical purposes, the output of operational amplifier 43 will always be either on or off.

To understand the manner in which motor 26 is controlled, consider the following three cases. In the first case, the coarse control voltage supplied from DAC 28 is far above the fine control voltage: in this case, operational amplifier 43 turns the motor on hard causing maximum possible acceleration. In case two, the control voltage supplied from DAC 28 is far below the fine control voltage, and the motor is turned off, resulting in maximum possible deceleration. These two cases correspond to a desired change in the transducer position from one zone to another.

In the third case, the coarse control voltage lies within the design range for operational amplifier 43, and the ripple component of the fine control voltage drives the voltage both above and below the level of the coarse control signal. Consequently, motor 26 is switched on and off at twice the TACH 0 frequency. If motor 26 speeds up, the duty factor decreases, which causes the motor 26 to slow down. If the motor 26 slows down, the duty factory increases, applying more power and increasing the speed of the motor. Thus, the speed of motor 26 is regulated by varying the average power to the motor 26. By operating the motor in a switching mode, power dissipation in control transistor 45 is minimized. To further reduce power loss, a fly back diode 61 is coupled across the power leads of motor 26 to store energy for a subsequent cycle.

As noted above, the TACH 0 signal is supplied as a reference input to controller 25. Controller 25 internally monitors the actual speed of the motor 26 and compares it with the commanded speed specified by zone speed signals DA0–DA7. Should the actual speed of motor 26 differ from the commanded speed by a relatively coarse amount, controller 25 can alter the digital character coupled to DAC 28 in order to provide a relatively rapid adjustment to the motor speed.

In order to provide fail-safe operation, the FIG. 5 circuitry incorporates two special functions, MOTOR START and MOTOR OFF. The MOTOR START function insures that motor 26 can be started and is afforded by a diode 63 coupled to the fine voltage control terminal and to a control signal output terminal of controller 25 labelled START 0. In response to the generation of the START 0 control signal, which is a low level signal, the fine control voltage signal applied to the inverting input terminal of operational amplifier 43 is pulled below the minimum coarse control voltage supplied by DAC 28, which results in application of control power to motor 26 as a result of the coarse control voltage output from DAC 28 alone. This virtually instantaneous removal of the fine control voltage from the servo loop eliminates any delay time in starting the motor which would normally be encountered if capacitor 59 were initially charged. The MOTOR OFF control function is controlled by the control signal labelled STOP 0 which is coupled via inverter 66 and diode 65 to the coarse control voltage input terminal to operational amplifier 43 and which instantaneously pulls the coarse control voltage down to an effective 0 level to cause the termination of power to motor 26.

Since the MOTOR START and MOTOR OFF functions are locally controlled by the controller 25, this unit also can be used to prevent destruction of the motor 26 in the event of a jam or excessive mechanical resistance to the motor operation (e.g. such as that caused by excess frictional drag in the disk drive unit). This is accomplished by establishing in the software portion of controller 25 a routine which times the period after the initiation of the MOTOR START cycle and compares the actual motor speed (via the TACH 0 signal) with the commanded speed. If motor 26 does not achieve the command speed within a predetermined time period (three hundred milliseconds in the preferred embodiment), controller 25 will generate the STOP 0 command. If desired, this checking routine may include an automatic retry after another predetermined fixed time period so that, barring a component failure, the motor portion of the disk drive will automatically restart as soon as the mechanical jam has been corrected by the operator (or the cause of the increased frictional resistance has been discovered and eliminated).

In disk drive systems incorporating the teachings of the invention, a substantial increase in the data storage capacity of the disk has been experienced. For example, for a five and a quarter inch diskette type floppy disk a maximum single side storage capacity of 640 K 8-bit bytes has been achieved using the variable speed control technique, which compares with maximum bit storage capacities ranging from 110 K to 320 K bytes with conventional commercially available systems. One of the reasons for this increased data storage capacity is the fact that the design of the data recovery circuitry can be simplified and optimized due to the relatively constant linear speed of the recording media with respect to the read/write transducers. In addition, the invention provides enhanced reliability to the read/write operation, and also provides an extremely fast transient response characteristic due to the combination of the fine normally closed analog control loop and the digital loop. For example, when viewed as a system block from the control voltage input to the motor speed as an output, the transient response to commanded step changes in speed exhibits a characteristic time constant of about thirty milliseconds. Slew rate for large steps (i.e. between zones) is so quick that the speed of motor 26 will inevitably arrive within the close regulation target speed (i.e. the point at which the fine control voltage assumes control) within approximately one hundred milliseconds. The limitations normally present in an analog closed loop servo system, namely long term instability, are overcome by the use of the digital outer loop including the controller 25.

An important feature of the preferred embodiment lies in the programmability of the actual zone speed values. By activating the SCRESET control input to the motor speed controller 25, new values of the zone speed signals can be stored in the microprocessor memory from the associated computer. In this way, the number of tracks in any given zone and the actual rotational (and thus linear) speed of the disk for that zone can be tailored to the requirements of a particular disk drive system.

While the above provides a full and complete description of the preferred embodiment of the invention, various modifications, alternate constructions and equivalents will occur to those skilled in the art. For example, while the controller 25 has been described with reference to a single disk drive motor 26, the functional operation of controller 25 may be expanded to include a second drive motor. In fact, as shown in FIG. 5, four additional input lines are shown labelled L1MS0–L1MS3 for receiving commands from the associated computer specifying track zones for a second disk drive, and corresponding SEL 1, TACH 1, START ONE and STOP ONE control lines. In addition, the DA0–DA7 zone command characters can be multiplexed and coupled to a second latch, similar to latch 41, to provide separate digital speed command signals for the second drive motor. Further, while uniform track zones have been illustrated in FIG. 4, different arrangements are possible. As an example, for a dual sided disk the following arrangement may be employed.

| ZONE | TRACKS lower head (standard) | TRACKS upper head | SECTORS PER TRACK | ROTATIONAL PERIOD (MS) |
| --- | --- | --- | --- | --- |
| 0 | 0–3 | unused | 19 | 237.9 |
| 1 | 4–15 | 0–7 | 18 | 224.5 |
| 2 | 16–26 | 8–18 | 17 | 212.2 |
| 3 | 27–37 | 19–29 | 16 | 199.9 |
| 4 | 38–48 | 30–40 | 15 | 187.6 |
| 5 | 49–59 | 41–51 | 14 | 175.3 |
| 6 | 60–70 | 52–62 | 13 | 163.0 |
| 7 | 71–79 | 63–74 | 12 | 149.6 |
| 8 | unused | 75–79 | 11 | 144.0 |

Therefore, the above descriptions and illustrations should not be construed as limiting the scope of the invention, which is defined by the appended claims.

What is claimed is:

1. A method of storing information on a rotatable magnetic disk using a movable recording transducer, said method comprising the steps of:
   (a) rotating said disk at a first angular speed when said transducer is operating over a first group of adjacent tracks; and
   (b) rotating said disk at a second angular speed when said transducer is operating over a second group of adjacent tracks located at different radial distances from the center of said disk from said first group of adjacent tracks;

said first and second angular speeds being selected to provide substantially the same relative linear speed between said transducer and the surface of said disk; and the number and location of each said group of tracks being selected in accordance with the minimum circumferential length of a track required to accommodate a sector of information.

2. The method of claim 1 wherein the number of adjacent tracks in said first group is different from the number of adjacent tracks in said second group.

3. A motor speed controller for a rotatable magnetic disk system, said controller including:

means responsive to a command signal specifying a track zone on the disk recording surface for generating a disk speed reference signal corresponding to said track zone, said means including motor speed controller means for generating zone speed control signals in response to said track zone commands and digital to analog converter means for generating said disk speed reference signal in response to said zone speed control signal;

means for converting said disk speed reference signal to an output signal adapted to be coupled to a disk motor; and means for generating a variable amplitude motor speed feedback signal from a variable frequency motor speed signal supplied from said disk motor, said converting means including first means for comparing said variable amplitude motor speed feedback signal with said disk speed reference signal and for switching said output signal in accordance with excursions in said motor speed feedback signal representing relatively small differences between motor speed and zone speed;

said disk speed reference signal generator further including means responsive to said variable frequency motor speed signal for altering the value of said zone speed control signal when the difference between motor speed and a presently specified zone speed is relatively large.

4. The combination of claim 3 wherein said variable amplitude motor speed feedback signal generator comprises a frequency to voltage converter for generating a triangular wave having a dc level proportional to the frequency of said variable frequency motor speed signal.

5. The combination of claim 3 wherein said controller includes means for disabling the application of said variable amplitude motor speed feedback signal to said comparing means during a start portion of a motor speed cycle to provide a relatively rapid slew rate from an initial substantially zero motor speed to a desired motor speed specified by said zone speed control signal; and means for disabling the application of said disk speed reference signal to said comparing means during a stop portion of a disk motor cycle to provide a relatively rapid slew rate from an existing motor speed to zero speed.

6. The combination of claim 3 wherein said controller includes second means for comparing said variable frequency motor speed signal with said zone speed control signal after the start of a motor speed cycle, and means for disabling the application of said disk speed reference signal to said first comparing means when the motor speed fails to achieve the zone speed within a predetermined time period.

7. The combination of claim 3 wherein said disk speed reference signal generator includes programmable means for generating said zone speed control signals from said track zone commands so that the desired zone speeds can be varied.

* * * * *